United States Patent
Wehn et al.

[11] 3,880,652
[45] Apr. 29, 1975

[54] METHOD FOR PURIFICATION OF TITANIUM SPONGE

[75] Inventors: William E. Wehn; George B. Cobel, both of Midland, Mich.; William E. Lusby, Severna Park, Md.

[73] Assignee: Crucible Inc., Pittsburgh, Pa.

[22] Filed: Nov. 9, 1970

[21] Appl. No.: 87,762

[52] U.S. Cl. .................................................. 75/84.5
[51] Int. Cl. ............................................... C22b 53/00
[58] Field of Search ............................... 75/84.5, 84

[56] References Cited
UNITED STATES PATENTS

| | | | |
|---|---|---|---|
| 2,456,935 | 12/1948 | Fisher | 75/84 X |
| 2,772,875 | 12/1956 | Levy | 75/84.5 X |
| 2,778,726 | 1/1957 | Winter et al. | 75/84.5 |
| 2,826,491 | 3/1958 | Findlay | 75/84 |
| 2,983,600 | 5/1961 | Blue et al. | 75/84.5 |
| 3,464,813 | 9/1969 | Shelton et al. | 75/84.5 X |
| 3,510,293 | 5/1970 | Poole et al. | 75/84.5 X |

Primary Examiner—Benjamin R. Padgett
Assistant Examiner—R. E. Schafer

[57] ABSTRACT

A method for removing magnesium and magnesium chloride from titanium sponge, after production thereof by reaction of titanium tetrachloride and magnesium, by introducing a high-temperature inert gas through the reaction product to vaporize the magnesium and magnesium chloride and then removing it in this gaseous form.

9 Claims, 1 Drawing Figure

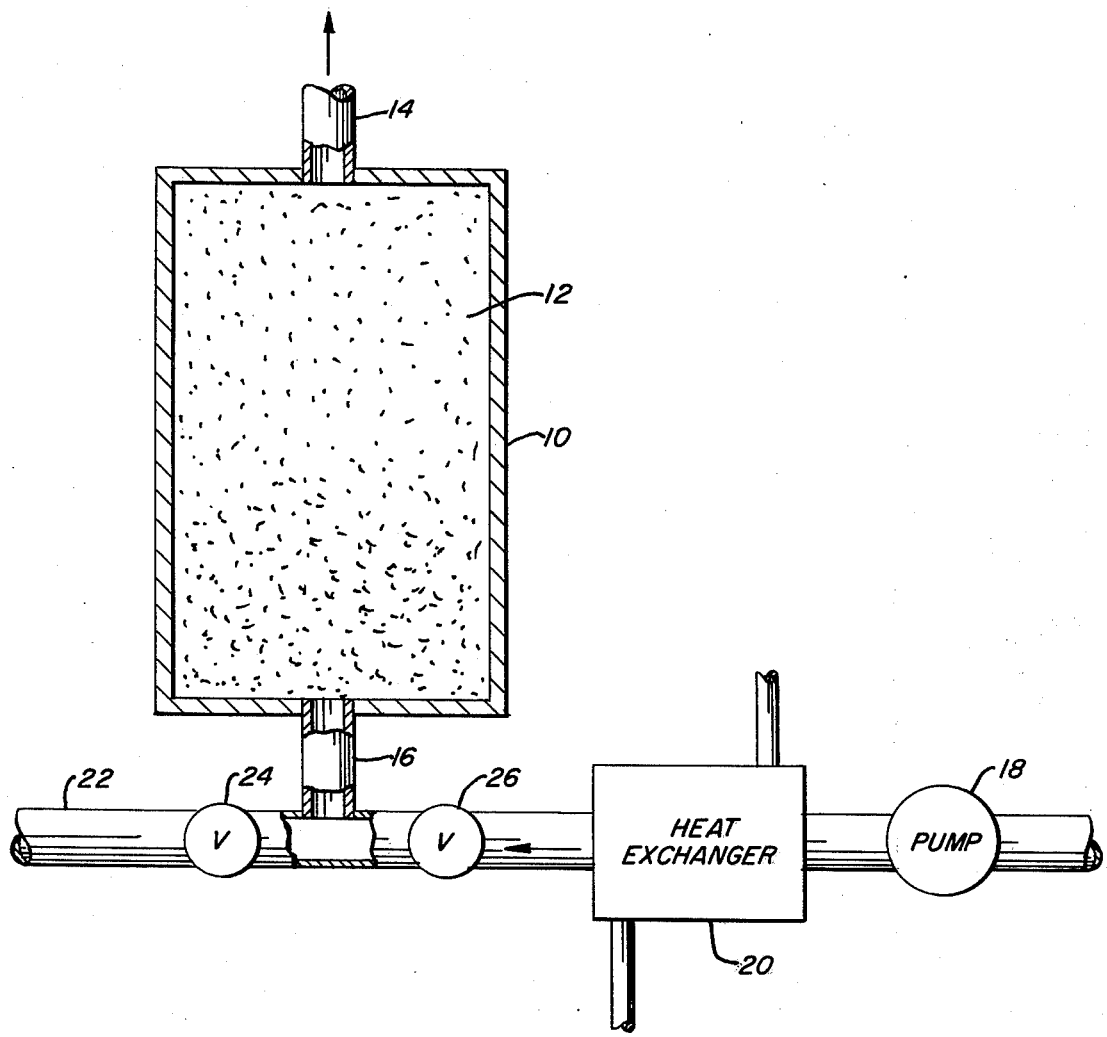

METHOD FOR PURIFICATION OF TITANIUM SPONGE

It is known to produce titanium sponge in accordance with the well-known Kroll process by reacting titanium tetrachloride (TiCl₄) with molten magnesium in a closed, purged reaction chamber. The chemical reaction within the chamber is as follows:

$$TiCl_4 + Mg \rightarrow Ti + MgCl_2$$

Upon completion of the process there are quantities of unreacted magnesium, as well as magnesium chloride, present within the reactor vessel with the titanium. To provide titanium that is of sufficient purity for subsequent alloy-melting applications it is necessary to remove the magnesium and magnesium chloride from the titanium.

There are two conventional methods available for separation of titanium from the magnesium chloride and the magnesium present in the reaction product. Each practice, however, has significant disadvantages, particularly from the commercial standpoint.

One process comprises leaching the reaction product, usually after crushing, in a dilute solution of hydrochloric acid containing an inhibitor. This dissolves most of the magnesium and magnesium chloride. However, some residue remains and causes difficulties in subsequent melting. With respect to the dissolving of the magnesium and its chloride, sufficient heat is produced to raise the temperature of the reaction product to a level at which contamination of the titanium can result. Consequently, it is necessary to refrigerate the leaching solution to maintain the temperature below 25°C. In addition, the hydrogen produced as a result of the reaction between magnesium and the acid will dissolve in the titanium. As is well known, the presence of hydrogen in the titanium causes undesirable embrittlement thereof.

Vacuum distillation is the alternate, and presently preferred, technique for removing magnesium and magnesium chloride from titanium. Vacuum distillation is performed at a temperature of 900°C, at which temperature the vapor pressure of magnesium is 76 mm of mercury and the vapor pressure of magnesium chloride is 7.6 mm of mercury. The vacuum distillation practice, of course, eliminates the problem of hydrogen absorption and resulting embrittlement of the titanium. However, the primary disadvantage of this practice is that in view of the high temperatures required and the inefficient heat transfer in vacuum, heating times are extremely long, which renders the practice uneconomical from the commercial standpoint.

It is accordingly the primary object of the present invention to provide an improved and more efficient method for removing unreacted magnesium and magnesium chloride from titanium.

A more specific object of the invention is to achieve the removal of magnesium and magnesium chloride from titanium without subjecting the same to hydrogen embrittlement or prolonged heating times.

These and other objects of the invention as well as a complete understanding thereof may be obtained from the following description, specific examples and drawing, in which:

The single FIGURE thereof is a schematic showing of apparatus suitable for the practice of the invention.

Broadly, in the practice of the invention, the product from the reaction of titanium tetrachloride with magnesium is placed in a closed vessel or retort. This reaction product consists of titanium sponge and unreacted magnesium and magnesium chloride. The reaction product may be subjected to the practice of the invention in the as-produced form or it may preferably be broken into chips or particles and placed in a second vessel. If the reaction product is to be treated in the as-produced form, it would be desirable to provide the reaction chamber with an interior thin steel liner so that this could be removed from the reaction chamber for use in the separation practice of this invention. In the practice of the invention, however, more efficient separation of the magnesium and magnesium chloride from the titanium is achieved if the reaction product is provided in the form of chips or particles; and consequently, this is the preferred practice.

With the reaction product contained in a sealed vessel, an inert gas, such as helium or argon, is introduced to the vessel, with the gas being at a temperature above the vaporization temperature of the magnesium and magnesium chloride at the partial pressure of such vapors existing within the vessel. For this purpose, the inert gas will be at a temperature of at least about 900°C. The gas at this elevated temperature is circulated through the vessel and into contact with the reaction product mass therein. In this manner the magnesium and magnesium chloride is volatilized and removed from the chamber with the gas. It may be seen that if the reaction product is in the form of particles more effective contact by the gas and thus more effective separation is achieved. The pressure of the inert gas upon introduction to the sealed vessel is at least about atmospheric. After removal of the volatilized magnesium and magnesium chloride, it is necessary to cool the separated titanium within the vessel to a temperature of less than about 100°C prior to any contact with the atmosphere, because titanium will oxidize at higher temperatures. Although various methods may be used to effect cooling of the titanium prior to removal from the vessel, most rapid and economical cooling for this purpose is achieved by circulating an inert gas through the vessel, which gas is at a temperature less than 100°C. In this manner rapid and efficient cooling is achieved in a manner similar to that by which the reaction product was heated to volatilize the magnesium and magnesium chloride. Like the heating step of the method, the inert gas used may be argon or helium. In both cases, however, the use of hydrogen must, of course, be avoided in view of the fact that absorption thereof by the titanium results in undesirable embrittlement.

With reference to the single FIGURE of the drawing, there is shown a sealed vessel 10, which may be the reaction chamber wherein the reaction product was produced by the reaction of titanium tetrachloride with molten magnesium or alternately may be a separate vessel wherein the reaction product is placed in particulate form after removal from the reaction chamber. In the FIGURE the reaction product, indicated as 12, is shown within the vessel 10 in particulate form, which is the form preferred in the practice of the invention to achieve most efficient heating and cooling by inert-gas circulation. The chamber has a top outlet 14 for exit of inert gas and volatilized magnesium and magnesium chloride from the reaction-product mass within the vessel. An inert-gas inlet 16 is provided at the bottom of the vessel. Inert gas, from a source not shown, is pumped by pump 18 through heat exchanger 20 to the inlet 16 wherein it enters the vessel 10 for circulation through the particulate reaction product mass. The pump 18 serves to introduce the gas to the vessel 10 at a pressure sufficient to permit efficient circulation through the reaction product mass. The heat exchanger 20 heats the gas, prior to its entry into the vessel 10, to a temperature sufficiently high to vaporize the magnesium and magnesium chloride at a reasonable rate, which is a temperature above the melting temperature of the magnesium and magnesium chloride in the reaction product. The melting temperature of magnesium is 650°C and magnesium chloride is 714°C. Magnesium volatilization begins at about 500°C and the volatilization of the magnesium chloride begins at a temperature of about 650°C. As the inert gas circulates through the reaction product mass 12, it heats the unreacted magnesium and magnesium chloride to their volatilization temperatures. Circulation of the inert gas is continued until separation of the magnesium and magnesium chloride from the titanium is completed. Upon completion of separation, it is necessary that the vessel 10 remain sealed against the atmosphere until the titanium therein has been cooled to a temperature of at least about 100°C. Otherwise, rapid oxidation of the titanium will occur.

For the purposes of cooling in a fast and efficient manner, a cooled inert gas may be introduced at the inlet 16 and circulated through the reaction product mass 12 until the desired temperature has been achieved. For this purpose pipe 22 is connected to a source of cooled inert gas, not shown. Valve 24 in pipe 22 is open and the valve 26 is closed during introduction of cooled inert gas.

In cases of both inert-gas heating and cooling, it is, of course, feasible to recirculate the gases. In the case of inert-gas heating, however, it will be necessary to purify the gas leaving the vessel via outlet 14, which gas has become saturated with magnesium and magnesium chloride vapors, prior to recirculating the same for reheating in heat exchanger 20 and reintroduction to the vessel 10.

It may be seen that with the practice of the invention, as described hereinabove, more efficient separation of the titanium from the magnesium and magnesium chloride is achieved over that obtained by either acid leaching or vacuum distillation. With respect to the former practice, such suffers from the basic disadvantage of hydrogen absorption by the titanium, which adversely affects the mechanical properties of the titanium, particularly from the standpoint of embrittlement. With respect to vacuum distillation, such practice is uneconomical in view of the long heating times required. Typically, with vacuum distillation the vessel containing the reaction product mass from which the magnensium and magnesium chloride are to be removed is placed within a furnace for heating to the vaporization temperature of the magnesium and magnesium chloride. Consequently, the heat is supplied through the walls of the container and thus can be made available only by conduction through the walls and the reaction product mass. The extremely low thermal conductivity of the titanium sponge of the reaction product mass limits heat flow, thereby necessitating prolonged heating times within the furnace to achieve complete separation by distillation. By the practice of the invention, however, the heat for vaporization of the magnesium and magnesium chloride is made available at the evaporation site, and thus thermal conduction through the vessel walls and reaction product mass is not a factor with regard to the efficiency of the operation.

Although the invention has been described as applied to titanium sponge produced by the use of magnesium for reaction with titanium tetrachloride, it will be appreciated that the invention may also be used for the separation by volatilization thereof of sodium or other reductants from the titanium sponge. With respect to sodium, it is well known to use it as a substitute for magnesium for reaction with titanium tetrachloride. The volatilization temperature of sodium is substantially the same as that of magnesium.

The term "unreacted reductant" as used herein means the reductant, per se, such as magnesium, as well as compounds thereof, such as magnesium chloride.

We claim:

1. A method for removing unreacted reductant present with titanium subsequent to production thereof by reaction of a reductant with a titanium compound to produce titanium by reduction of said titanium compound, said method comprising providing a reaction product mass of unreacted reductant and titanium within a sealed vessel, introducing an inert gas to said vessel at a temperature above the melting temperature of said unreacted reductant, circulating said gas through said vessel and into contact with said reaction product mass to volatilize said unreacted reductant and removing the volatilized product from said vessel, whereby said unreacted reductant is separated from said titanium.

2. The method of claim 1 wherein said titanium is in particulate form within said vessel.

3. The method of claim 1 wherein subsequent to removal of said volatilized product from said vessel in an inert gas at a temperature less than 100°C is circulated through said vessel and into contact with said titanium.

4. The method of claim 1 wherein said inert gas is at least one gas selected from the group consisting of argon and helium.

5. The method of claim 1 wherein said inert gas is at a temperature of at least 900°C.

6. The method of claim 1 wherein said inert gas is introduced to said vessel at a pressure of at least atmospheric.

7. The method of claim 1 wherein said titanium compound is titanium tetrachloride and said reductant is a reductant selected from the group consisting of magnesium and sodium.

8. The method of claim 1 wherein said titanium compound is titanium tetrachloride and said reductant is magnesium.

9. A method for removing unreacted reductant present with titanium subsequent to production thereof by reaction of a reductant with a titanium compound to produce titanium by reduction of said titanium compound, said method comprising providing a reaction product mass of unreacted reductant and titanium in particulate form within a sealed vessel, introducing an inert gas at a temperature of at least 900°C to said vessel and at a pressure of at least atmospheric to said sealed vessel, circulating said gas through said vessel and into contact with said reaction product mass to volatilize said unreacted reductant and removing the volatilized product from said vessel, whereby said unreacted reductant is separated from said titanium.

* * * * *